Figure 1:
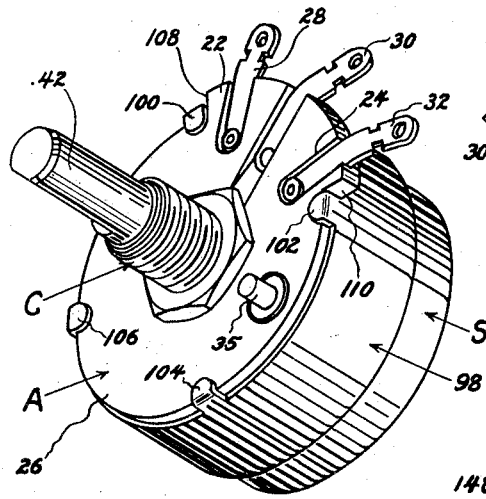

Dec. 27, 1938. C. J. HATHORN 2,141,907
COMBINED VOLUME CONTROL AND SWITCH UNIT
Filed Dec. 11, 1933 3 Sheets-Sheet 1

INVENTOR.
C. J. Hathorn.
BY Harry Langsam
ATTORNEY.

Dec. 27, 1938.     C. J. HATHORN     2,141,907
COMBINED VOLUME CONTROL AND SWITCH UNIT
Filed Dec. 11, 1933     3 Sheets-Sheet 2
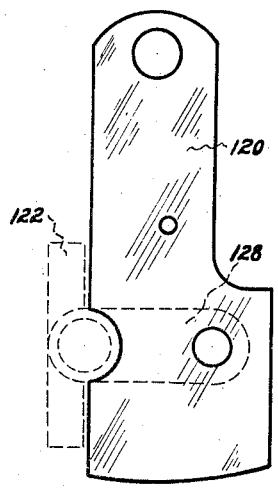
Fig.12
Fig.13
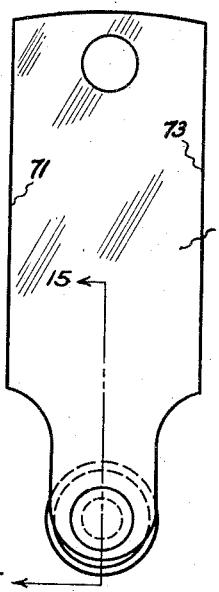
Fig.14
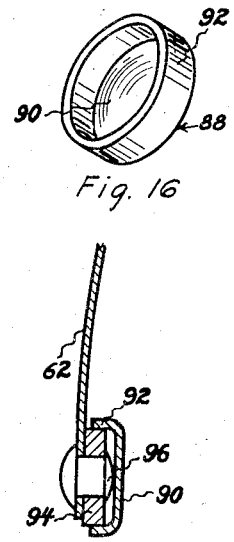
Fig.16
Fig.15
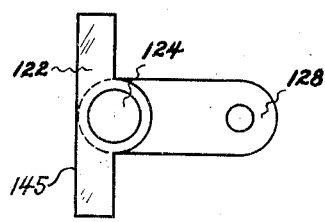
Fig.17
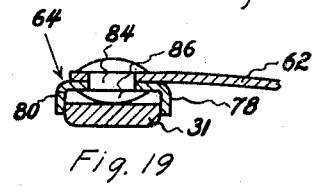
Fig.19
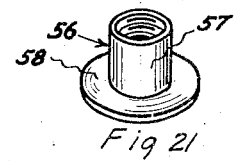
Fig.21
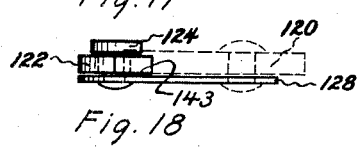
Fig.18
Fig.20
Fig.22
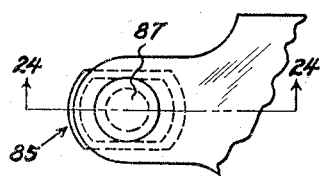
Fig.23
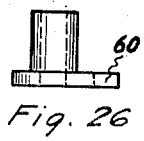
Fig.26
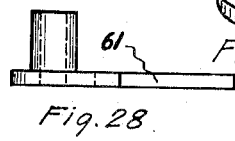
Fig.28
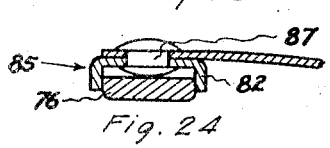
Fig.24
Fig.27
Fig.29
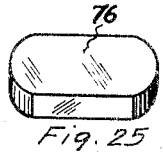
Fig.25
INVENTOR.
C.J. Hathorn
BY Harry Langsam
ATTORNEY.

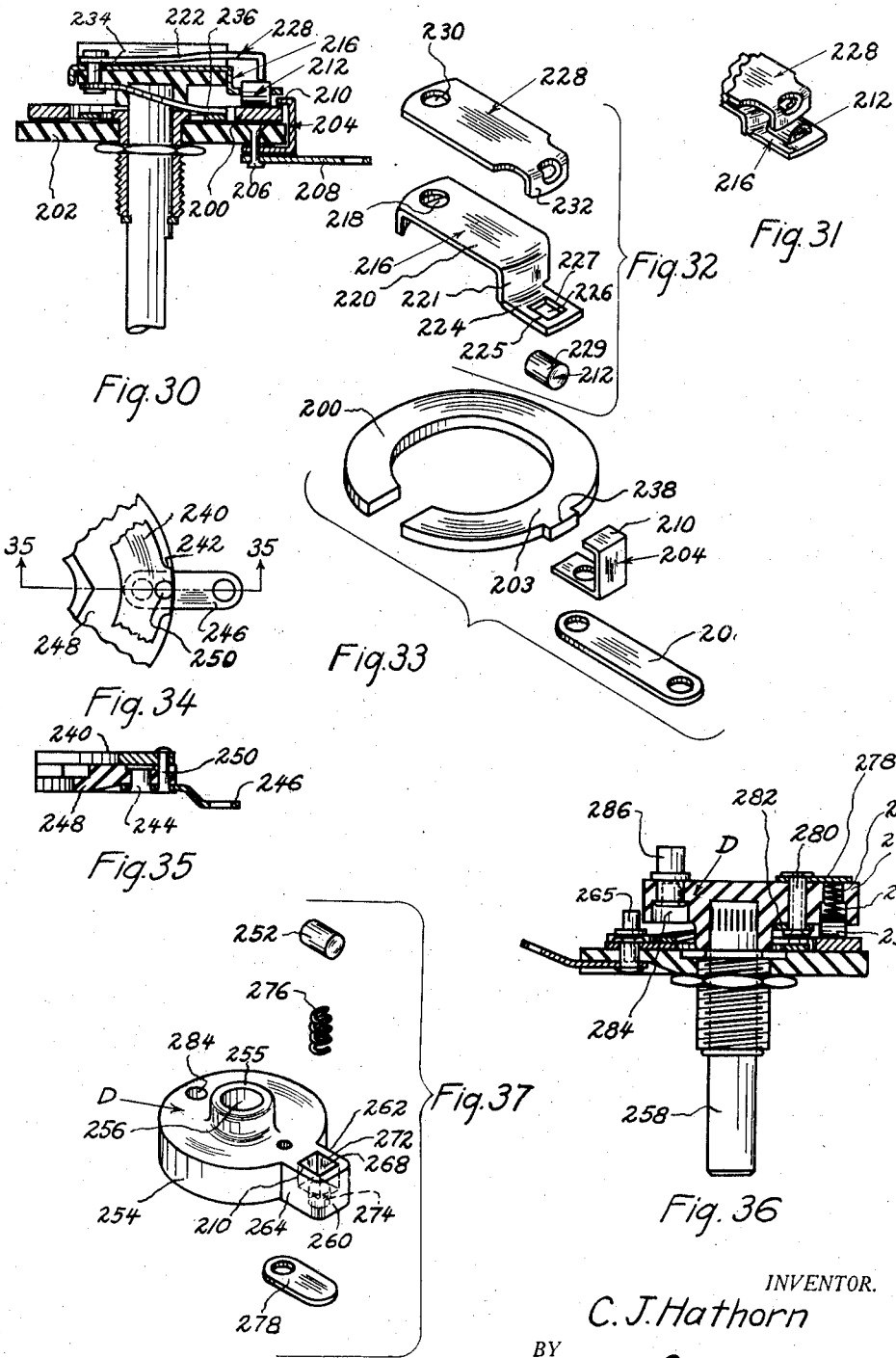

Patented Dec. 27, 1938

2,141,907

UNITED STATES PATENT OFFICE 2,141,907

COMBINED VOLUME CONTROL AND SWITCH UNIT

Clarence J. Hathorn, St. Marys, Pa., assignor to The Stackpole Carbon Company, a corporation of Pennsylvania Application December 11, 1933, Serial No. 701,802

1 Claim. (Cl. 201—48)

This invention relates to an adjustable resistance device combined with an electric circuit-maker or breaker unit operated by a single control, and is particularly adapted for use in radio circuits and public addressing systems.

Adjustable resistance devices are employed in radio circuits or public addressing systems to control the volume of sound emitted by the loud speaker; and the circuit-maker or breaker, in the form of a snap-switch, is employed to open or close the electrical power circuit. As the combined volume control and power switch unit must be compact it is necessary to position the various elements constituting the instrumentalities in such manner as to reduce the space occupied to a minimum value.

It is an object of my invention to provide in a rheostat or volume control a movable contact shoe or current collector which will adjust itself to any irregularities appearing on the surface of the resistance element and still not cause any abrasion between the contact shoe and the resistance element.

Another object of my invention is to provide a novel spring pressure arm for engaging a resistance element contact shoe wherein the turning torque will be applied substantially along the entire length of the pressure arm.

Another object of my invention is to combine a power switch together with a volume control so that the switch during assembly will be placed on the volume control in a predetermined position.

Another object of my invention is to provide a power switch which will simultaneously close or open the electrical circuit at two places in order to quickly extinguish the arc.

A further object of my invention is to provide a power switch wherein the same spring which closes or opens the circuit also maintains the contact between the bridging terminal and the terminals connected to the outside circuit.

A still further object of my invention is to provide a simple, efficient snap-switch trigger mechanism.

Other objects of my invention are to provide an improved device of the character described, which is easily and economically produced, that is sturdy in construction, and which has a maximum efficiency and accuracy in operation.

Figure 2:
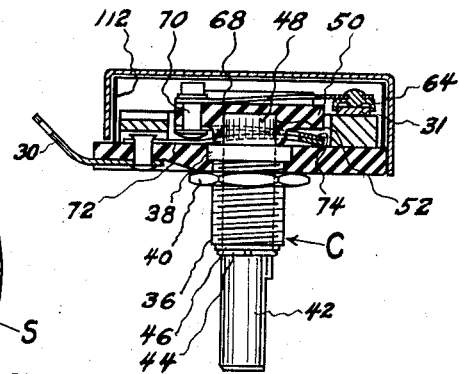
Figure 3:
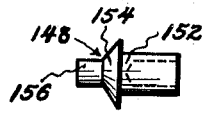
Figure 4:
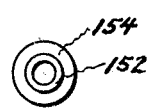
Figure 5:
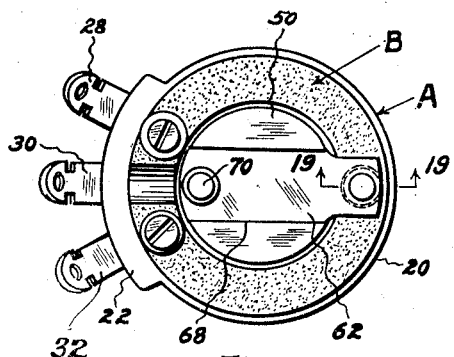
Figure 6:
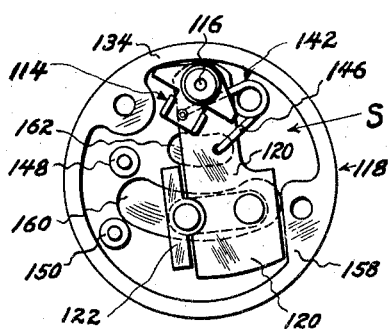
Figure 7:
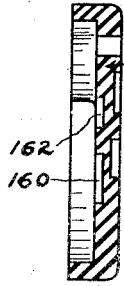
Figure 8:
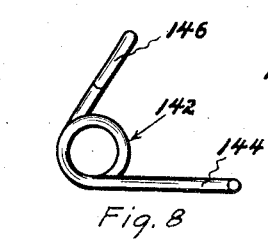
Figures 10, 11:
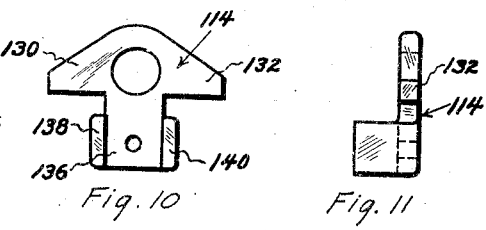
Figure 9:
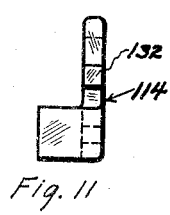

With the above and related objects in view, my invention consists in the following described details of construction and combination of parts, which will be more fully understood from the following description, when read in conjunction with the accompanying drawings, in which:

Figure 1 is a perspective view of the assembled volume control and switch unit embodying my invention, Figure 2 is a sectional view taken through the volume control unit and its casing, Figure 3 is a side view of the snap switch circuit terminal, Figure 4 is a plan view of the terminal shown in Figure 3, Figure 5 is a plan view of the volume control, Figure 6 is a plan view of the assembled snap switch, Figure 7 is a sectional view of the snap switch casing alone, Figures 8 and 9 are plan and side elevational views respectively, of the snap-switch torsional spring, Figures 10 and 11 are plan and side elevational views respectively, of the snap-switch trigger, Figures 12 and 13 are plan and side elevational views respectively, of the contact throw arm for the snap switch, Figure 14 is a plan view of the assembled volume control pressure arm, its contact shoe holding member, and the contact shoe, Figure 15 is a sectional view taken on the line 15—15 of Figure 14, Figure 16 is a perspective view of a modified contact shoe embodying my invention, Figures 17 and 18 are plan and side elevational views respectively, of the snap switch contact bar and its pivotal holding support, Figure 19 is a sectional view of the contact shoe and its holding member as taken on the line 19—19 of Figure 5, Figure 20 is a perspective view of the contact shoe as shown in Figures 2 and 5, Figures 21 and 22 are perspective views of the holding nut and bolt respectively, for holding the volume control resistance element, the base and the terminal in operative relationship, Figure 23 is a plan view, looking from the top of the pressure arm, wherein another modified contact shoe and holder is shown, Figure 24 is a sectional view taken on the line 24—24 of Figure 23, Figure 25 is a perspective view of the modified contact shoe as shown in Figures 23 and 24, Figures 26 and 27 are plan and side views respectively, of a modified type of holding-nut having therein a nest for the contact shoe, Figures 28 and 29 are plan and side views respectively, of another modification of a holding nut having therein an extension to contact one edge of the resistance element, Figure 30 is a fragmentary sectional view of another modification of a rheostat, Figure 31 is an assembled perspective view of the cylindrical contact shoe and its movable and pressure members, Figure 32 is an exploded view of Figure 31, Figure 33 is an exploded view of the modified resistance element and its "tap-off" connections, Figure 34 is a fragmentary plan view of another modification of the resistance tap-off, Figure 35 is a sectional view taken on the line 35—35 of Figure 34, Figure 36 is a fragmentary sectional view taken through another modification of a volume control, and Figure 37 is an exploded view of the insulated rotatable member, the contact shoe, the pressure spring, and the pressure spring holding member.

Referring now in detail to the drawings I show in Fig. 1 a combined volume control and switch unit embodying my invention and in Fig. 2 is shown the volume control as used alone. A rheostat or volume control base, generally designated as A, is formed of an insulating material upon which a resistance element, generally designated as B, is arcuately mounted. The base A has an arcuate edge 20 forming the major peripheral portion of the base and, an extending edge 22 forming the minor peripheral portion of the base, both edges extending in the same plane but the minor peripheral arcuate edge 22 extends a greater distance from a central aperture than the edge 20.

A plurality of recesses 24 extend on the outside face 26 of the base but within the radial limits of the peripheral edge 22. Each recess has therein a conducting strip of metal or terminal 28 which connects the outside circuit to the resistance element, as hereinafter explained in greater detail. Each terminal is of a width substantially equal to that of the recess in order to prevent any lateral displacement of the terminal.

The central terminal member 30 is adapted to connect a movable contactor or contact shoe 31, which forms one side of the derived electrical circuit, to an external circuit, whereas the other terminal members 28 and 32 are connected to the minimum and maximum resistance extremities of the resistance element. It is to be noted that the groove or recess 24 is sufficiently deep in the outer surface of the base so that the rivet or grommet for retaining and electrically connecting the terminal will be removed from engaging the panel upon which the rheostat control is mounted. Such arrangement of the grooves eliminates short-circuits between the panel and the rheostat.

Mounted exteriorly upon the base A is a stud 35 which may be a separate piece securely held on the base or it may be molded integrally with the base. The stud fits into a complementary opening on the panel to which the unit is attached in order to prevent any relative turning movement of the unit about the axis of the shaft when the control shaft is rotated.

A journal bushing, generally designated as C, is mounted centrally through the aperture in the base A. The bushing, of the single-hole mounting type, is exteriorly threaded as at 36 and is held in position by its flange 38 engaging one face of the base and, also, a retaining nut 40 threaded on the bushing and engaging the other face of the base. The above mentioned arrangement of the flange and nut prevents any relative movement between the bushing and the base either in a rectilinear direction along the longitudinal axis of the bushing or in a rotary direction about the bushing.

Journaled for rotary movement within the bushing C is an elongated control shaft 42 substantially of cylindrical formation. An annular groove 44, suitably positioned from the outer end of the shaft, receives a lock-washer or split-clip 46 for preventing the shaft from moving inwardly since the lock-washer 46 may engage the end of the journal bushing. The serrated inner end portion 48 of the shaft, carrying a rotatable insulating member 50, fits into a complementary opening 52 of the aforesaid member. The rotatable member, at assembly, is forced upon the shaft so the serrations therein bite into the wall forming the opening 52 to secure the rotatable member rigidly in operative position. The rotatable member in addition to turning in unison with the shaft also prevents the shaft from moving outwardly from the journal bushing.

The rheostat may be regulated in any desired manner as by means of a knob which is positioned on the outer end of the control shaft. The knob is held to the control shaft by means of a set screw which engages a suitable flattened portion of the shaft.

The film-type of resistance element B, is concentrically positioned upon the base A close to its outer edge and the ends of the resistance film are suitably connected to the outside terminals as by rivets, bolts, or screws of electrical conducting material.

For details of construction of a specific resistance element reference is made to the copending application of Henry B. Arnold and Ernest G. Jacobs, Serial Number 663,538, filed March 30, 1933.

However, I provide a novel means of connecting the resistance element, the base and the terminal together. A bolt 54 of good electrical conducting material, having a screw-threaded shank is passed through one end of the terminal, through the base and through one end of the resistance element with the head of the bolt against the terminal. An internally threaded nut 56, having a cylindrical outer surface 57 and a radial extending flange 58, is screwed onto the bolt. However, the bolt may be screwed on the nut without any change in function. The circular flange 58 of the bolt makes a good electrical contact with the resistance element as a considerable contact area is established between the flange and the resistance element thus, minimizing the contact resistance. The outer surface 57 of the nut extends upwardly and provides a stop for the contact shoe as the nut is impinged upon by the pressure arm at the limit of its stroke. The flange of the bolt may have a crescent shaped cutout portion 60 to form a nest for the contact shoe, as well shown in Figs. 26 and 27. The diameter of the recess or nest is slightly larger than the diameter of the contacting shoe together with its holder so that the contact shoe's periphery is separated from the concentric edge of the terminal by only a few thousandths of an inch. Or the flange, of high conductivity material, may be shaped to have an elongated extension 61, see Figs. 28 and 29, along one edge of the resistance element which edge will be in close proximity to the contact shoe as the shoe approaches the end of the resistance element.

Such extension provides a low resistance between the shoe and the terminal to enable a low resistance "hop-off" to be made.

By using a low resistance extension at one terminal it may be necessary to widen the resistance element adjacent that particular terminal, but such widening does not affect the function of the device. Thus, there are two resistances of different resistivities in overlapping, parallel, electrical contacting relationship at one end of the resistance element. In a combined switch and rheostat unit the control shaft must move a predetermined distance away from the low resistance terminal before the switch is opened; and, if no provision for a low resistance "hop-off" were made the initial minimum resistance would be of a very high resistance value instead of a low resistance value.

A flexible pressure arm 62 is comprised of a thin slightly bowed substantially rectangular metallic member. An opening, through which a fastening rivet or bolt may pass, is formed at one end of the pressure arm 62 and the other end of the pressure arm carries a contact-shoe holding member 64 which functions both for moving the contact shoe 31 over the resistance element upon movement of the pressure arm and, also for permitting the contact shoe to adjust itself on the resistance element.

The pressure arm is fastened, at the end with the opening therein, within a groove 68 which extends across the rotatable insulating member. The point of attachment of the pressure arm on the rotatable insulating member is at a greater distance from the contact shoe than the radial distance from the control shaft to the resistance element, this arrangement providing flexibility to the arm which otherwise would not be obtained since the pressure arm would be too rigid due to the relatively short distance between the control shaft and the resistance element.

The pressure arm holding rivet 70, eccentrically mounted with respect to the control shaft, is of sufficient length to engage and provide the driving torque for the snap-switch trigger mechanism, as hereinafter further described.

The pressure arm as commonly used and composed of two arms which converge together has a tendency to twist a very small amount about the fulcrum of each arm due to the lack of transverse rigidity at the free end of the arms. The hereinabove related twisting or torsional movement produces a slight noise in the loud speaker of the circuit when the contact shoe is moved by the pressure arm. In my novel arrangement no twisting of the pressure arm will occur when movement of the contact shoe takes place because of the transverse stiffness of the pressure arm 62, which is of one piece, and the engagement of the arm with the side walls forming the groove 68. It should be observed that a turning couple actuates the rotary movement of the pressure arm irrespective of the direction of movement, for each of the sides 71 and 73 of the pressure arm are engaged by each of the side walls of the groove.

As illustrated in Figure 2 of the drawings, a resilient washer 72 of electrical conducting material is mounted on the base and has a tongue which is connected to the mid-terminal 30. In sliding contact engagement with the washer 72 is another complementary spring washer 74 fastened directly on the rotatable insulating member by the pressure arm holding rivet or bolt 70. The washer 74 has the tendency to spring away from the lower surface of the rotatable insulating member 50, but rotates with that member. Thus, it is seen that an electrical connection is made between the resistance element and the terminal 30 irrespective of the position of the contact shoe; the circuit being completed through the contact shoe 64, the spring arm 62, the sliding washer 74, and its stationary complementary washer 72 and the terminal 30. As the washers 72 and 74 are concentrically positioned away from the control shaft an insulated control shaft is provided.

The rigid flat self-adjusting contact shoe 31, of the wiping type, engages the resistance element B. The shoe, also of suitable electrical conducting material, may be constructed of a disk or circular formation, see Figs. 2, 19 and 20, and due to its construction it presents a large contact area on the resistance element thus effecting a low contact resistance; or in order to approximate a "line" contact the shoe 76, see Figs. 23, 24 and 25, has two of its diametrical arcuate edges removed so that it is wide, in order to extend across the resistance element, and relatively short in length as compared with its width and it is, also, short in length as compared with the linear length of the resistance element.

The disk-shaped contact shoe 31 has its periphery engaged by a flange or rim 78 of the complementary cup-shaped holding member 64; the holding member being mounted on the end of the pressure arm. The cup-shaped member 64 is comprised of a flat base 80 and the downturned flange 78 which forms the cup or receptacle for the contact shoe, see Figs. 19 and 20. A round-headed rivet 84 pierces both the pressure arm and the base of the cup-shaped member and holds them rigidly together after the rivet's outer end is expanded.

The modified contact shoe 76, as shown in Figs. 24 and 25, is held within a complementary-shaped holding member 85 which is mounted on the end of the pressure arm. A round-headed rivet 87 functions on the shoe 76 similarly as the rivet 84 functions on the contact shoe 31.

The central upper surface of the contact shoe 31 is engaged by the rivet head 86 of the rivet 84, as is well shown in Figs. 2 and 19, when the contact shoe is positioned on the resistance element and within the cup-shaped member. The shoe will seat or adjust itself properly on the resistance element and travel over any irregularities or imperfections therein, as a slight loss motion exists between the periphery of the shoe and its complementary surrounding flange, and in addition to the loss-motion arrangement the rounded rivet head substantially engages the upper central portion of the shoe at a point. Thus, a low resistance contact is practically assured at all times between the resistance element and the contact shoe.

It is to be noted, at this time, that the pressure arm is electrically connected to the resistance element by virtue of the connections or electrical path through the contact shoe, the holding bolt and, also, the cup-shaped shoe moving member.

In Figs. 14, 15, and 16 is shown another embodiment of a contact shoe, wherein a cup-shaped contact shoe 88 is comprised of a flat surface 90 for engaging the resistance element and a peripheral flange 92 extends from the flat contact surface. The peripheral flange of the shoe cooperates with a complementary disk 94 mounted on the end of the pressure arm so that movement of the pressure arm moves the contact shoe member. The rounded head of a rivet 96, which holds the disk to the pressure arm, engages the upper portion of the flat surface 90 of the contact shoe and permits the contact shoe to pivotally move about the head. By the hereinabove described arrangement the contact shoe, in view of its universal connection with the shoe holding disk and the rivet, will travel over any irregularities or imperfections which may appear on the resistance element and, thus, insures substantially a uniform contact resistance.

The rheostat shell or housing 98 is comprised of a circular planar metallic base whose peripheral edge or flange is bent to project substantially perpendicular to the base. During the stamping operation a plurality of ears 100, 102, 104 and 106 and, also, a short recess are formed on the extremity of the flange by removing the surrounding metal. The short peripheral recess is formed in the flange to fit over the base extension 22.

The ears 100, 102 are so positioned that they engage the sides 108, 110 of the minor peripheral edge 22, and when all the ears 100, 102, 104, and 106 are downturned or clinched over the outside face of the base A no relative movement may occur between the base and its casing in either a rotary direction about the axis of the shaft or in a longitudinal direction along the axis of the shaft.

Interiorly mounted abutting the inner periphery of the casing flange is a circularly disposed strip of insulation 112 of uniform width. The strip of insulation is disposed between the resistance element and the flange of the casing and serves to extrude dirt, dust, moisture and other foreign substances from entering the casing, it serves to prevent any short-circuits between the rheostat elements and the casing, and it further serves as a positioning means so that the base of the casing will remain at a predetermined distance from the insulating base.

A snap switch, generally designated as S, shown assembled with the volume control in Fig. 1, and shown in greater detail in Fig. 6, may be mounted on the base of the casing or shell 98 by any suitable means. An aperture is provided through the shell so a trigger operating mechanism 114 on the switch may protrude therethrough. The aperture on the shell for the trigger is sufficiently large so that the trigger does not, at any time, contact the shell.

The switch S is securely mounted on the back of the metallic casing, and the casing 98 when grounded acts as an electromagnetic and an electrostatic shield to prevent any feedback noises from the power circuit when the contact shoe is moved.

The switch mechanism is mounted within an insulating base, preferably comprised of a molded phenol condensation product. A pivot 116 is located in the lower portion of the switch-base 118 and upon the pivot is loosely mounted a contact carrying arm 120 of insulating material which is wide at its free end portion. A contact or short-circuiting blade member 122 comprising a substantially rectangular low-resistance metallic bar is pivotally mounted as at 124 in the same plane as the contact carrying arm.

A contact spring support 126, see Figs. 17 and 18 carries at one end the pivot 124 about which the contact member 122 is mounted. The other end 128 of the contact spring support is securely attached to the contact arm by a suitable holding means as, for example, an eyelet or a rivet.

Likewise loosely mounted on the same pivot, as shown in Fig. 6 is the switch-throw trigger 114 which has laterally extending wings 130 and 132 for limiting the movement of the trigger by engaging the flange 134 of the switch base. Extending perpendicular to but in the same plane as the wings 130 and 132 is a member 136, to which one leg of the torsional spring is attached. A pair of arms 138 and 140 are integrally formed at one end of the member 136 by a stamping operating with the trigger member. The arms project perpendicular to the body or member 136 of the trigger and are adapted to be transiently engaged by the bolt 70 on the rotatable member for moving the trigger from one side to the other side.

A torsional spring 142 has one of its legs 144 connected to the switch-throw trigger and its other leg 146 connected to the contact carrying arm.

Movement of the trigger does not actuate the contact carrying member until the medial axis of the closed end of the spring passes slightly beyond dead center as the trigger compresses the spring-arms of the torsion spring together. The energy stored in the spring rapidly turn the contact-carrying-member, either closing the electrical circuit when the terminals are bridged or breaking the circuit when the bridging contact is moved away from the terminals. However, as the rheostat control shaft also actuates the snap switch it is essential that the control shaft be rotated through a small fraction of the entire angle that it may be rotated before the switch is actuated, as such arrangement allows the major movement of the control shaft to control the position of the contact shoe on the resistance element.

The torsion spring 142 not only throws the contact carrying member with great velocity but, also, presses the carrying member 120 inwardly against the switch base 118, so that in circuit closing position the side wall 143 of the contact member 122 engages a terminal flange 154, and the front wall 145 of the contact member 122 engages the shank 156.

The snap switch circuit terminals 148 and 150, see Figs. 3, 4, and 6, suitably spaced apart, are adapted to be contacted by the bridging member 122 for closing the circuit and, also, are positioned to limit the movement of the contact carrying member 120 at the circuit closing end of its oscillation.

To the outside end of each snap switch terminal is connected an electrical conducting strip of metal, having an eye or opening therein. Lead wires from the main circuit pass through the eye and are soldered to the conducting strip in order to make a low resistance connection.

Each of the snap-switch terminals is comprised of a hollow cylindrical base 152 which passes through and holds itself to the base and the outside circuit terminal in rigid relationship after its end is peened over. From the other end of the terminal extends the flange 154 which tapers until the cylindrical shank 156 is reached. The contact bar electrically contacts the cylindrical shank and, also, the flange to bridge the terminals and thus close the circuit.

It is to be recalled, at this time, that the breaking of an electrical circuit creates an arc which tends to pit and destroy the contacts. By the above arrangement of the power circuit contacts a double break in the circuit is simultaneously effected by a snap action which is a decided advantage as the arc is quickly extinguished with very little burning of the contacts.

As the torsional spring tends to press or urge the contact carrying arm against the base, the side 143 of the bridging bar 122 and the flange 154 of each terminal are the first and the last portions to make an electrical contact. Thus a wiping action, which tends to keep the contacts clean, and a bump-type of contact is employed, maintaining a low contact resistance in operation. It is seen that the arcing will primarily take place between the flange and the side of the short circuiting bar, which ordinarily perform no function in the device nor do they affect the main contacts. Therefore, since arcing does not occur at the main contacts, the main conducting surfaces remain relatively clean so that the life of the switch will be prolonged.

An internal extending ridge portion 158, see Fig. 6, of the switch base adjacent the upper portion of the contact carrying member 120 limits the backward movement of the contact carrying member. An arcuate formed groove 160 in the base formed in the path of the swing of the arm 120 permits the pivotal member 128 to slide freely therein; and another arcuate groove 162 in the path of the movement of the end of the torsional spring prevents any frictional engagement between the end 146 of the spring and the base.

The resistance gradient curve of the resistance element is made non-uniform or irregular, since the resistance variation of the resistance element is other than a linear function of the movement of the contact shoe thereon. The non-uniform resistance element is used in order that the volume of sound emitted by the loud speaker in a radio circuit shall be directly proportional to the movement of the resistance control arm. In order to practically obtain in a derived electrical circuit the predetermined resistance gradient of the resistance element it is theoretically necessary to have a contact solely on a line, for otherwise a wide contact current collector obliterates, at all times, a definite proportion of the resistance element causing the resistance to jump considerably from one value to another instead of varying in infinitesimal steps. It is, also, essential that the contact shoe be clean otherwise oxidation of the metal, or dirt, will cause the contact resistance to be so high that no current will be taken from the resistance element. To more nearly approximate the above mentioned ideal conditions I provide a cylindrical contact member of electrical conducting material wherein the curved bounding surface frictionally engages the resistance element approximately on a line.

Referring now, more particularly to Figs. 30, 31, 32 and 33, I show another modification of a volume control or rheostat wherein a resistance element 200 coated on one side with a carbonaceous film type is suitably mounted upon a non-conducting base 202. Intermediate the minimum and the maximum resistance terminals is a tap-off 203. At this tap-off I coat the underside of the resistance element with a conducting film of a length substantially equal to that of the width of a tap-off terminal 204. The short under-side film coating is but a continuation of the main film coating and is placed on the resistance element to reduce the resistance value of the tap-off to a minimum value.

A rivet 206 passes through the insulating base 202, through an end of a strip of metal conducting material 204 and through one end of an outside tap-off terminal 208. The head of the rivet 206 is constructed so that it will be flush with the surface of the insulating base after its shank end is expanded or peened over to hold the strip of conducting material 204 and one end of the outside tap-off terminal 208 in position. The narrow conducting strip 204, however, has one end 210 engage the resistance element at its outer edge but the end 210 is positioned so that a cylindrical contact shoe 212 will not be obstructed in its movement over the resistance element. The strip 204 abuts the outer peripheral edge of the insulating base and is sufficiently bent inwardly from the peripheral edge to have the rivet 206 pass therethrough to hold it in engagement with the tap-off terminal 208. This strip 204 and the rivet 206 render a low contact resistance from the resistance element to the terminal 208.

The cylindrical contact shoe 212 is positioned on the resistance element so its longitudinal axis will extend substantially parallel to the longitudinal axis of the movable arm and its cylindrical bounding surface engages the resistance element in order to obtain substantially a line contact. The shoe 212, constructed of high electrical conductivity material, is held within a complementary opening 226 of a movable member, generally designated as 216, and so accommodates itself on the resistance element.

The movable member 216 has an opening 218 in its main portion 220, and from the main portion is a bend 221 which passes partially around the movable insulating member 222 and then has an offset portion 224 within which is located an opening 226 for the contact shoe 212. When the shoe is within the opening 226 movement of the insulating member 222 pushes the shoe, as one of the walls 225 or 227, which partially define the opening 226, engages the curved bounding surface 229 of the contact shoe. However, the member 216 only applies the moving force to the cylindrical contact shoe. A separate pressure arm 228 having an opening 230 in one end and a downturned portion 232 at the other end provides a suitable pressure for urging the contact shoe into engagement with the resistance element. A bolt 234 passes through a rotary contactor member 236, through the insulating member 222, though the openings 218 and 230 of the movable member 216 and the pressure arm 228 respectively, and holds the above elements together after its end is expanded or peened over.

Although the pressure arm and the movable arm are disclosed as being constructed of separate elements a single movable element having an extending ear to serve as a pressure member may be employed. The contact shoe may either roll or it may slide on the resistance element depending on the tightness of the contact shoe in its complementary opening in the movable arm and, also, the pressure exerted by the pressure arm.

Assembling and constructing the elements, shown in Figs. 30, 31 and 32, so that a beneficial wiping or burnishing action will take place between the resistance element and the contact shoe, it is to be observed that the same area of the contact shoe does not always engage or wipe the resistance element when the direction of rotation of the contact shoe is changed. Or in other words when the contact shoe moves counterclockwise a definite contact surface or area of the shoe engages the resistance element; however, when the direction is reversed to a clockwise direction, the contact shoe shifts or rolls slightly to another or second contact area. Further movement of the contact shoe in the clockwise direction only brings the second area or surface in engagement with the resistance element. As the general effect of the movement of the contact shoe on the resistance element is that of a burnishing or wiping contact the contact surface will generally be kept clean from any corrosive effects and of particles of dust, and the contact shoe will also slide over any projections or irregularities on the surface of the resistance element without scoring the resistance element.

The resistance element may be widened as at 238 to have an extending conducting edge which may, if desired, readily be engaged by the end 210 of the conducting strip 204.

It is oftentimes difficult to make the required tap on the volume control which tap is used in a tone correction or automatic tone compensation circuit. This difficulty may be overcome by using another modification of a tap-off embodied within a volume control, as shown in Figs. 34 and 35. The periphery of the resistance element 240 is extended or widened as at 242 at the tap-off; such construction being similar to the portion designated as 238 in Fig. 33.

A rivet 244, for holding a tap-off terminal 246, has a head which is flush with the inside face of the insulating base 248. The head of the rivet is engaged by the abutting face of the resistance element which may be coated by a conducting film only at the abutting portion in order to aid in reducing the contact resistance. A second rivet 250 pierces and retains, after its ends are expanded, the outside tap-off terminal 246, the base 248 and the widened portion 242 of the resistance element.

Referring now to Figs. 36 and 37 wherein is shown an insulating base, generally designated as D, for holding and moving a cylindrical contact shoe 252.

The insulating base D has a disc portion 254, and centrally extending from one face of the insulating base is a cylindrical portion 255 having a bore 256 within which bore a control shaft 258 may be operably retained. Upon the periphery of the disc portion 254 is an extension 260 which need be of no greater thickness that the thickness of the disc portion 254. The extension 260 protrudes over the arcuately mounted resistance element and is sufficiently wide to have its walls 262 and 264 which define its width, engage each of the projecting terminal connectors 265 of the resistance element at the limit of its movement in either direction, thus the extension limits the movement of the insulating base. The linear distance between the walls 262 and 264 must be such that the full length of the resistance element is utilized when the control shaft rotates the contact shoe from the stop position at one end of the resistance element to the stop position at the opposite end of the resistance element.

The cylindrical contact shoe 252, of the same type designated as 212 in Figs. 30, 31 and 32, is mounted within an oblong bore 268 through the extension 260, so that the longitudinal axis of the contact shoe will remain substantially parallel to the surface of the resistance element as the contact shoe 252 is pushed by either of the walls 270, 272. The particular wall which may engage the curved bounding surface of the contact shoe depends, of course, upon the direction of movement of the control shaft. Extending from the oblong bore in the extension is a circular bore 274 which completes an aperture through the extension. A helical pressure spring 276 of electrical conducting material and of predetermined elasticity is freely compressible within the circular bore 274 and urges the contact shoe 252 into electrical engagement with the resistance element.

Since the resistance element is of the film conducting type and the contact shoe presents substantially a line contact the resistance gradient curve as obtained will have a smooth progression instead of a noticeable step-by-step resistance value progression.

A metal strip 278 of electrical conducting material has an opening at one end and is of substantially rectangular formation. The strip 278 retains the helical spring 276 in position by covering or partially covering the circular bore 274 wherein the helical spring is encased. The apertured end of the metal strip is rigidly retained on the insulating member D by an electrical conducting rivet 280 which also retains the sliding electrical collector member 282 on the insulating member D. The electrical circuit from the adjustable contact shoe 252 to the outside terminal is completed through the helical spring 276, the strip 278, the rivet 280, the sliding collector member 282 and a stationary collector member over which the sliding member 282 moves. The outside terminal member, of course, is electrically connected to the stationary collector member.

Within an aperture 284 adjacent the periphery of the movable insulating base D is an extending cam stud 286 securely mounted in the aperture 284 which stud is adapted for operating a snap-switch throw trigger mechanism, after a suitable snap-switch is attached in operative relationship on the volume control in order that both the snap-switch and the volume control may be operated by a single control shaft.

From the above defined structure and arrangement of parts it is seen that a rigid insulated movable arm or base of unitary construction may readily be employed within a volume control. Of course, the resiliency provided by the spring 276 reacting against the cylindrical contact shoe 252 permits the shoe to adjust itself on the resistance element irrespective of any irregularities thereon, and it also maintains a proper electrical contact pressure between the resistance element and the contact shoe without causing any scoring of the resistance element when movement of the contact shoe occurs. The pressure of the spring in addition to performing the functions as above stated also determines whether a rolling or a sliding movement is to occur between the cylindrical contact shoe and the resistance element. If the pressure of the spring on the contact shoe is sufficiently large then the frictional component is such as to prevent the curved surface of the contact shoe from rolling on the resistance element when the contact shoe is pushed, and if the pressure of the spring on the contact shoe becomes or is predeterminedly low then the cylindrical contact shoe will roll over the resistance element when the shoe is pushed.

Although the above embodiments of the invention have been described in considerable detail, such description is intended as illustrative rather than limiting, as the invention may be variously embodied. My invention, therefore, is not to be restricted except as it is made necessary by the prior art and by the spirit of the appended claim.

I claim as my invention:

In combination, an insulating base, a projection on said insulating base, a plurality of notches formed in said projection, a terminal fitting into each of said notches, a cup-shaped housing having a cylindrical peripheral wall open at one end, a notch on the open end of the peripheral wall adapted to receive the base projection whereby the housing and base are definitely positioned to constitute a substantially closed housing.

CLARENCE J. HATHORN.